(12) United States Patent
Ogiwara et al.

(10) Patent No.: US 10,520,104 B2
(45) Date of Patent: Dec. 31, 2019

(54) FUEL CUTOFF VALVE

(71) Applicant: HONDA MOTOR CO., LTD., Tokyo (JP)

(72) Inventors: Naoki Ogiwara, Wako (JP); Yuki Koga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/614,707

(22) Filed: Jun. 6, 2017

(65) Prior Publication Data
US 2017/0350521 A1 Dec. 7, 2017

(30) Foreign Application Priority Data

Jun. 6, 2016 (JP) .................................. 2016-112921

(51) Int. Cl.
*F16K 24/04* (2006.01)
*B60K 15/035* (2006.01)

(52) U.S. Cl.
CPC .......... *F16K 24/044* (2013.01); *B60K 15/035* (2013.01); *B60K 15/03504* (2013.01);
(Continued)

(58) Field of Classification Search
CPC ........ F16K 24/044; F16K 24/04; F16K 24/06; F16K 27/07; Y10T 137/3099;
(Continued)

(56) References Cited

U.S. PATENT DOCUMENTS 4,886,089 A * 12/1989 Gabrlik ............ B60K 15/03519
 137/202
7,770,594 B2 * 8/2010 Kishi .................... F16K 24/044
 137/202
(Continued)

FOREIGN PATENT DOCUMENTS

CN 201661388 U 12/2010
JP 2001-182633 A 7/2001
(Continued)

OTHER PUBLICATIONS

Japanese Office Action dated Feb. 27, 2018, with English translation, 6 pages.
(Continued)

*Primary Examiner* — Craig J Price
(74) *Attorney, Agent, or Firm* — Rankin, Hill & Clark LLP

(57) ABSTRACT

A fuel cutoff valve has: a valve mechanism that cuts off a communication between a fuel tank and a canister; an upper space defined above the valve mechanism; a tube body that has a tube passage to be communicated with the upper space and introduces a fuel gas to the canister; a retaining chamber defined by a first fuel shielding portion and a second fuel shielding portion to retain a liquid fuel stored in the upper space; a liquid reservoir portion defined between the tube body and the first fuel shielding portion to store the liquid fuel flowing out of the retaining chamber; and a communication portion through which the retaining chamber communicates with the liquid reservoir portion; wherein the communication portion is formed at a position deviated from the tube body so as not to overlap the tube body, when the tube body is seen in its axial direction.

2 Claims, 8 Drawing Sheets

(52) U.S. Cl.
CPC ... *B60K 15/03519* (2013.01); *Y10T 137/0874* (2015.04); *Y10T 137/3099* (2015.04)

(58) Field of Classification Search
CPC ........... Y10T 137/0874; Y10T 137/053; Y10T 137/0753; Y10T 137/0777; Y10T 137/6004; Y10T 137/7361; Y10T 137/7423; Y10T 137/7426; Y10T 137/86324; Y10T 137/86332; B60K 15/03504; B60K 15/03289; B60K 15/035; B60K 15/03519; F16L 47/02; F16L 47/14; F02M 37/017; F02M 37/0076
USPC .................................................. 137/43, 202
See application file for complete search history.

(56) References Cited

U.S. PATENT DOCUMENTS

| | | | | |
|---|---|---|---|---|
| 8,042,564 | B2* | 10/2011 | Ando | B60K 15/03504 137/202 |
| 8,141,576 | B2* | 3/2012 | Matsuo | F16K 31/22 137/202 |
| 8,720,472 | B2 | 5/2014 | Kito et al. | |
| 8,910,652 | B2* | 12/2014 | Nemeth | B60K 15/03519 137/202 |
| 2004/0050418 | A1* | 3/2004 | Yoshihara | B60K 15/03519 137/202 |
| 2004/0055638 | A1* | 3/2004 | Yamada | F16K 24/042 137/202 |
| 2004/0238034 | A1* | 12/2004 | Suzuki | F16K 24/044 137/202 |
| 2006/0011234 | A1 | 1/2006 | Spink et al. | |
| 2007/0084510 | A1* | 4/2007 | Kaneko | F16K 24/044 137/202 |
| 2009/0194170 | A1 | 8/2009 | Martin et al. | |

FOREIGN PATENT DOCUMENTS

| | | |
|---|---|---|
| JP | 2006-27603 | 2/2006 |
| JP | 2010-105523 | 5/2010 |
| JP | 5547695 B2 | 2/2013 |

OTHER PUBLICATIONS

Japanese Office Action with English Translation dated Jul. 24, 2018, 9 pages.
Chinese Office Action with English translation dated Jan. 28, 2019, 11 pages.

* cited by examiner

FUEL CUTOFF VALVE

CROSS REFERENCE TO RELATED APPLICATION

The present application claims the benefit of priority to Japanese Patent Application No. 2016-112911 filed on Jun. 6, 2016, the disclosure of which is incorporated herein by reference.

BACKGROUND OF THE INVENTION

Field of the Invention

The invention relates to a fuel cutoff valve that cuts off communication between a fuel tank and a canister.

Description of the Related Art

A fuel cutoff valve may be arranged in a fuel tank of a car. The fuel cutoff valve releases an evaporated fuel to a canister arranged outside so as not to increase an internal pressure of the fuel tank. Further, the fuel cutoff valve cuts off an opening portion that communicates with the canister to prevent a liquid fuel from flowing outside when a liquid level of the liquid fuel exceeds a given height.

For example, JP5547695B discloses a fuel cutoff valve having a liquid shielding member. The liquid shielding member defines a retaining chamber that temporarily retains the liquid fuel so as not to let the liquid fuel retained in an upper space flow to the canister.

SUMMARY OF THE INVENTION

JP5547695B discloses a structure of the fuel cutoff valve in which the retaining chamber that temporarily retains the liquid fuel is arranged in the same axial direction as a tube member that communicates with the canister. Therefore, in JP4437695B, the liquid fuel temporarily retained in the retaining chamber may possibly flow out to the canister through the tube member.

Therefore, an aspect of the invention is, in view of the problem above, to provide a fuel cutoff valve that improves a gas-liquid separation function and prevents a liquid fuel from flowing to a canister.

To solve the problem, a fuel cutoff valve according to the invention has: a valve mechanism including a float and a valve body that is disposed above the float, the valve body preventing a vapor from flowing in a vapor passage through which a fuel tank communicates with a canister by closing a connecting hole in the valve mechanism; an upper space that is defined above the valve body; a tube body that has a tube passage to be communicated with the upper space and introduces a fuel gas to the canister; and a retaining chamber that is defined in the upper space and that is defined by a fuel shielding plate to retain a liquid fuel stored in the upper space; and the fuel cutoff valve further has: a liquid reservoir portion that is defined between the tube body and the fuel shielding plate to store the liquid fuel flowing out of the retaining chamber; and a communication portion through which the retaining chamber communicates with the liquid reservoir portion; wherein the communication portion is formed at a position deviated from the tube body so as not to overlap the tube body, when the tube body is seen in its axial direction.

According to the invention, the liquid fuel stored in the liquid reservoir portion easily returns to the valve body through the communication portion through which the liquid reservoir portion communicates with the retaining chamber and the retaining chamber. Thus, in the structure having the retaining chamber that is defined by the liquid shielding plate to retain the liquid fuel in the invention, a gas-liquid separation function to the fuel is improved and the liquid fuel is prevented from flowing out to the canister.

Further, according to the invention, the communication portion is formed at a position deviated with respect to its axial direction so as not to overlap the tube body. Accordingly, the liquid fuel is further prevented from flowing out to the canister, as compared with the related art in which a tube body communicated with a canister is directed in the same axial direction as a retaining chamber.

Still further, the invention provides an air-tight tank system having the fuel tank and the fuel cutoff valve that is installed in the fuel tank.

According to the invention, in the air-tight tank system in which the liquid fuel is easily sucked to the retaining chamber by a differential pressure generated in the fuel tank, the liquid fuel stored in the liquid reservoir portion easily returns to the valve body through the communication portion and the retaining chamber.

The invention provides a fuel cutoff valve that improves a gas-liquid separation function to a fuel and prevents the liquid fuel from flowing out to the canister.

DETAILED DESCRIPTION OF THE PREFERRED EMBODIMENTS

Figure 1:
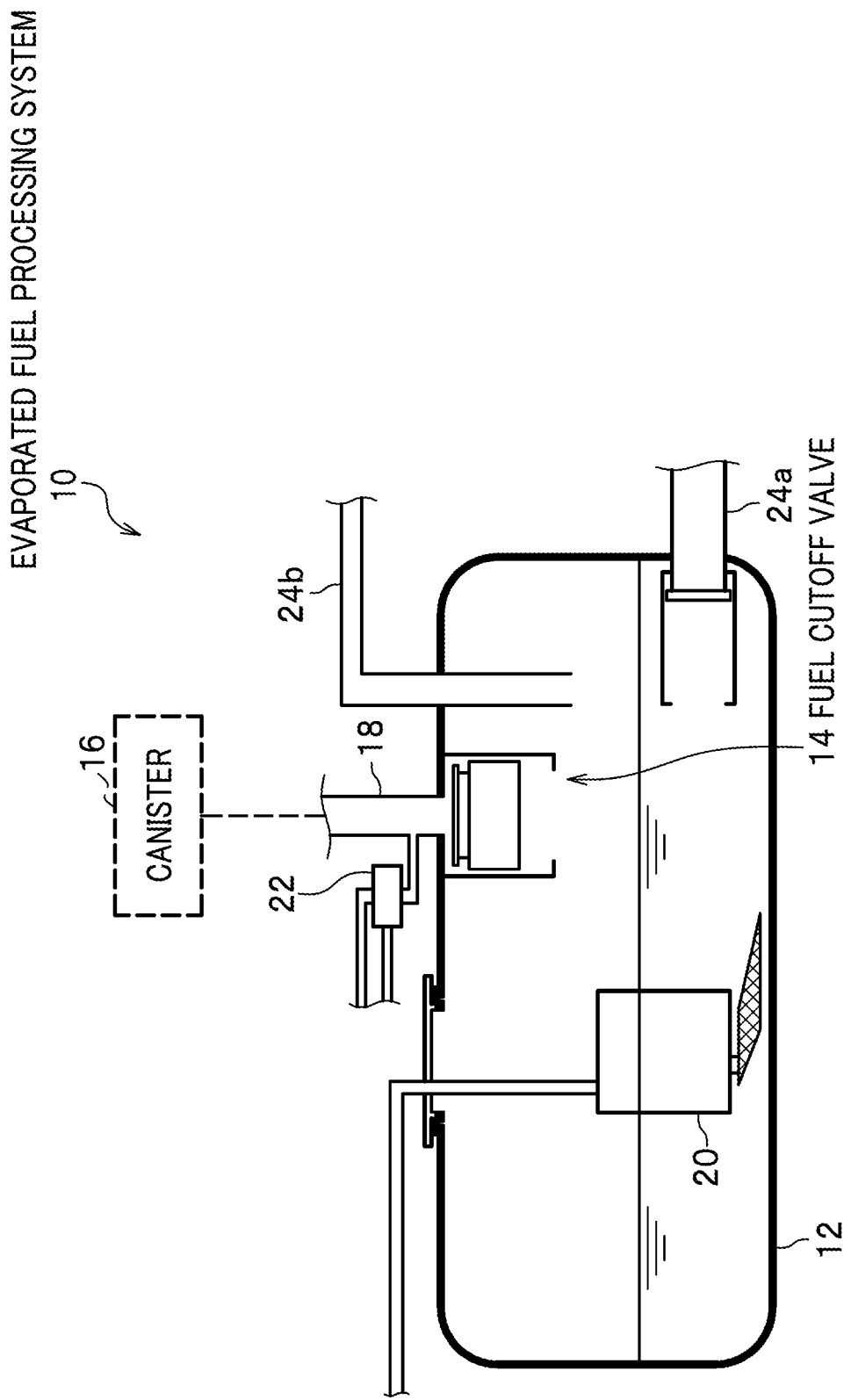
FIG. 1 is a schematic view of an evaporated fuel processing system installed with a fuel cutoff valve according to an embodiment of the invention.

An embodiment of the invention will be explained in detail appropriately referring to drawings. FIG. 1 is a schematic view of an evaporated fuel processing system installed with a fuel cutoff valve according to an embodiment of the invention, FIG. 2 is a perspective view of the fuel cutoff valve according to the embodiment of the invention, and FIG. 3 is a partially omitted cross-sectional view of the fuel cutoff valve shown in FIG. 2 which is assumed to be cut off in an axial direction.

As shown in FIG. 1, the evaporated fuel processing system 10 has a fuel cutoff valve 14 mounted on an upper portion of the fuel tank 12. The fuel cutoff valve 14 cuts off communication between the fuel tank 12 and a canister 16 that is arranged outside the fuel tank 12. The fuel cutoff valve 14 closes a connecting hole 50 described later for preventing a vapor from flowing in a vapor passage 18 through which the fuel tank 12 communicates with the canister 16.

In FIG. 1, note that a reference numeral 20 denotes a pump that feeds a fuel in the fuel tank 12 to an internal combustion engine (not shown), a reference numeral 22 denotes a pressure sensor that detects a pressure inside the fuel tank 12 (tank internal pressure), a reference numeral 24a denotes a filler pipe and a reference numeral 24b denotes a breather pipe (or a vapor return pipe) that are arranged between the fuel tank 12 and a fuel lid (not shown), respectively. Note that the fuel tank 12 with an air-tight valve (not shown) that is arranged between the fuel tank 12 and the canister 16 forms an air-tight tank system that is shut off from an atmosphere.

Figure 2:
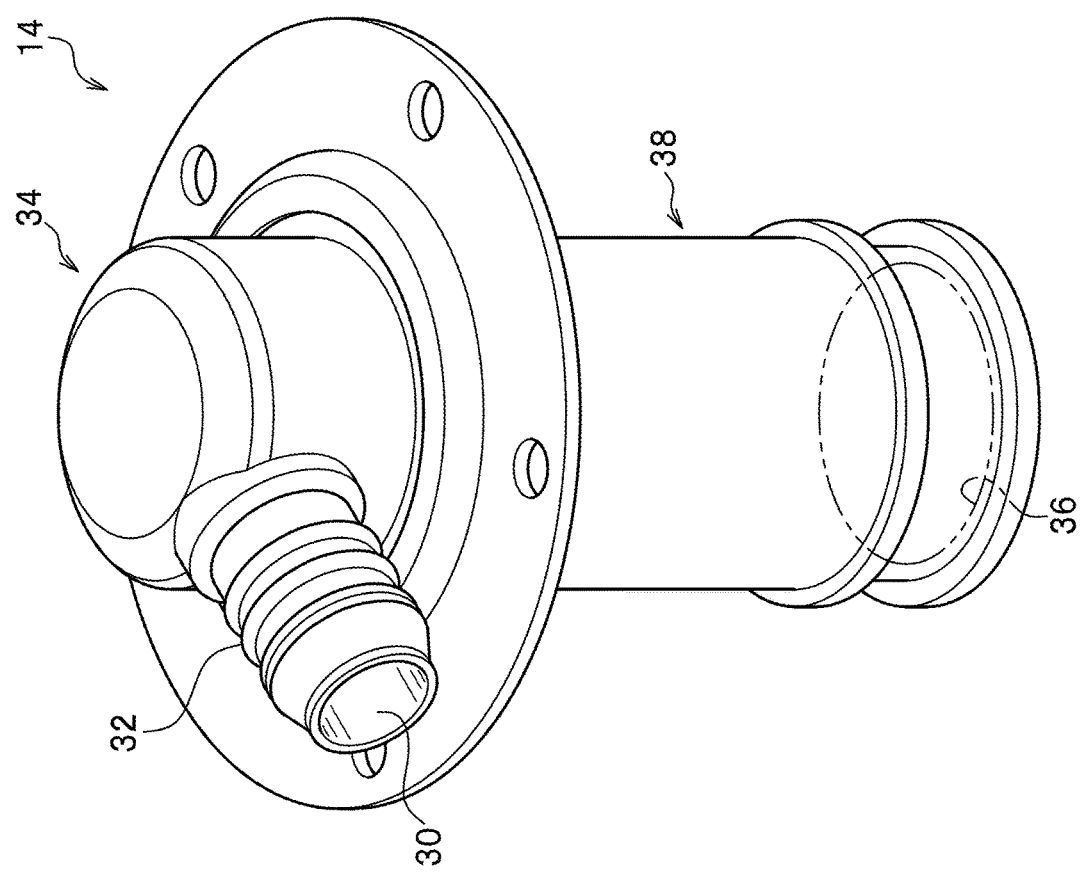
FIG. 2 is a perspective view of the fuel cutoff valve according to the embodiment of the invention.
Figure 3:
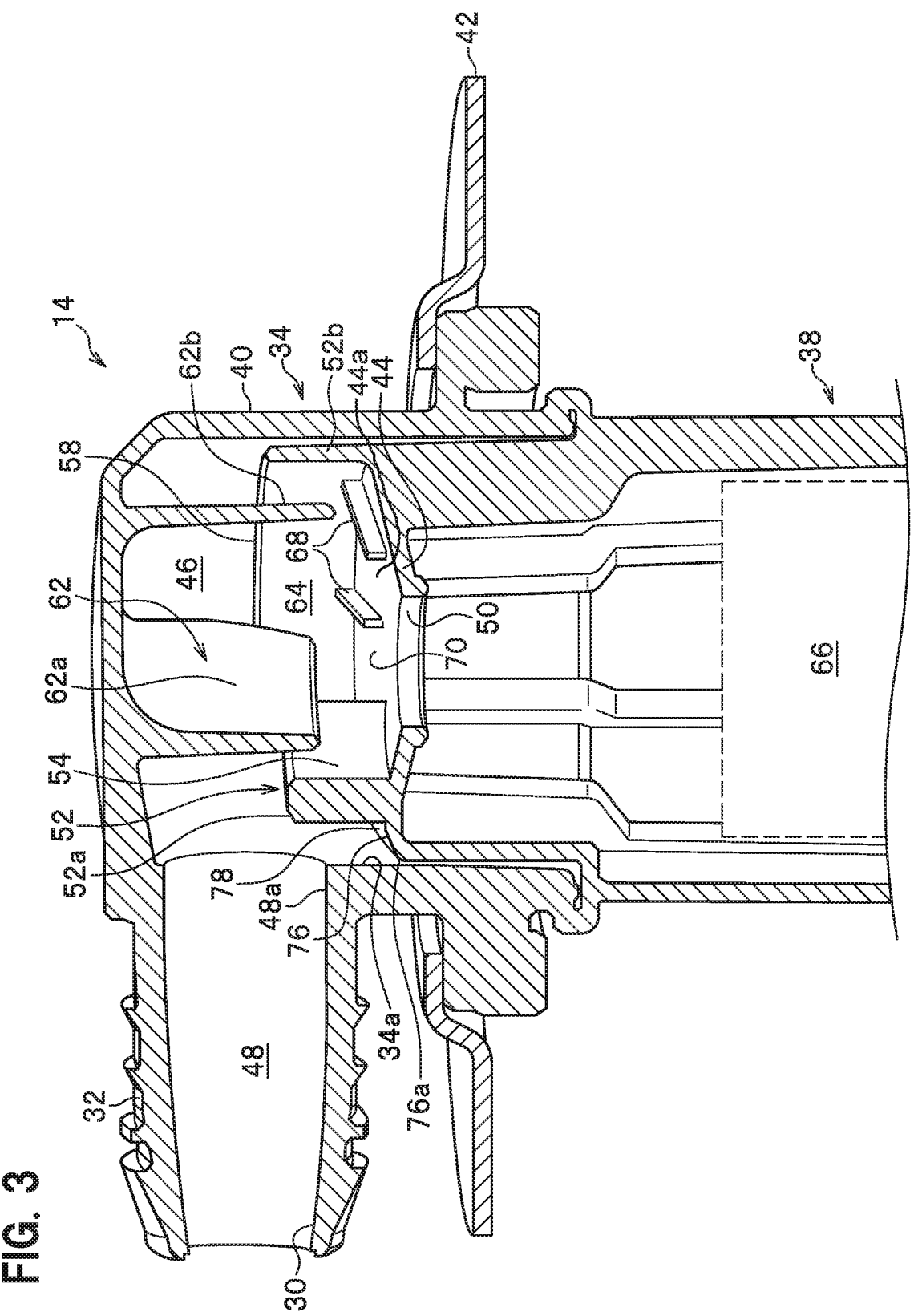
FIG. 3 is a partially omitted cross-sectional view of the fuel cutoff valve shown in FIG. 2, whose portion is assumed to be cut off in an axial direction.

As shown in FIG. 2, the fuel cutoff valve 14 includes a lid body portion 34 having a tube body 32 in which a first port 30 is formed, and a main body portion 38 in which a second port 36 is formed and that is assembled with the lid body portion 34 in one piece. The first port 30 is exposed outside the fuel tank 12 and is connected with the vapor passage 18 (see FIG. 1). The second port 36 is formed at a bottom surface of the main body portion 38 to be in the fuel tank 12.

As shown in FIG. 3, the lid body portion 34 has a lid body 40, the tube body 32 that extends outward from the lid body 40, and a disc-like annular flange 42 that surrounds an outer peripheral surface of the lid body 40 and extends radially outward. An upper space 46 is defined between the lid body portion 34 and an upper wall 44 as described below of the main body portion 38. A tube passage 48 that communicates with the upper space 46 is formed in the tube body 32.

Figure 4:
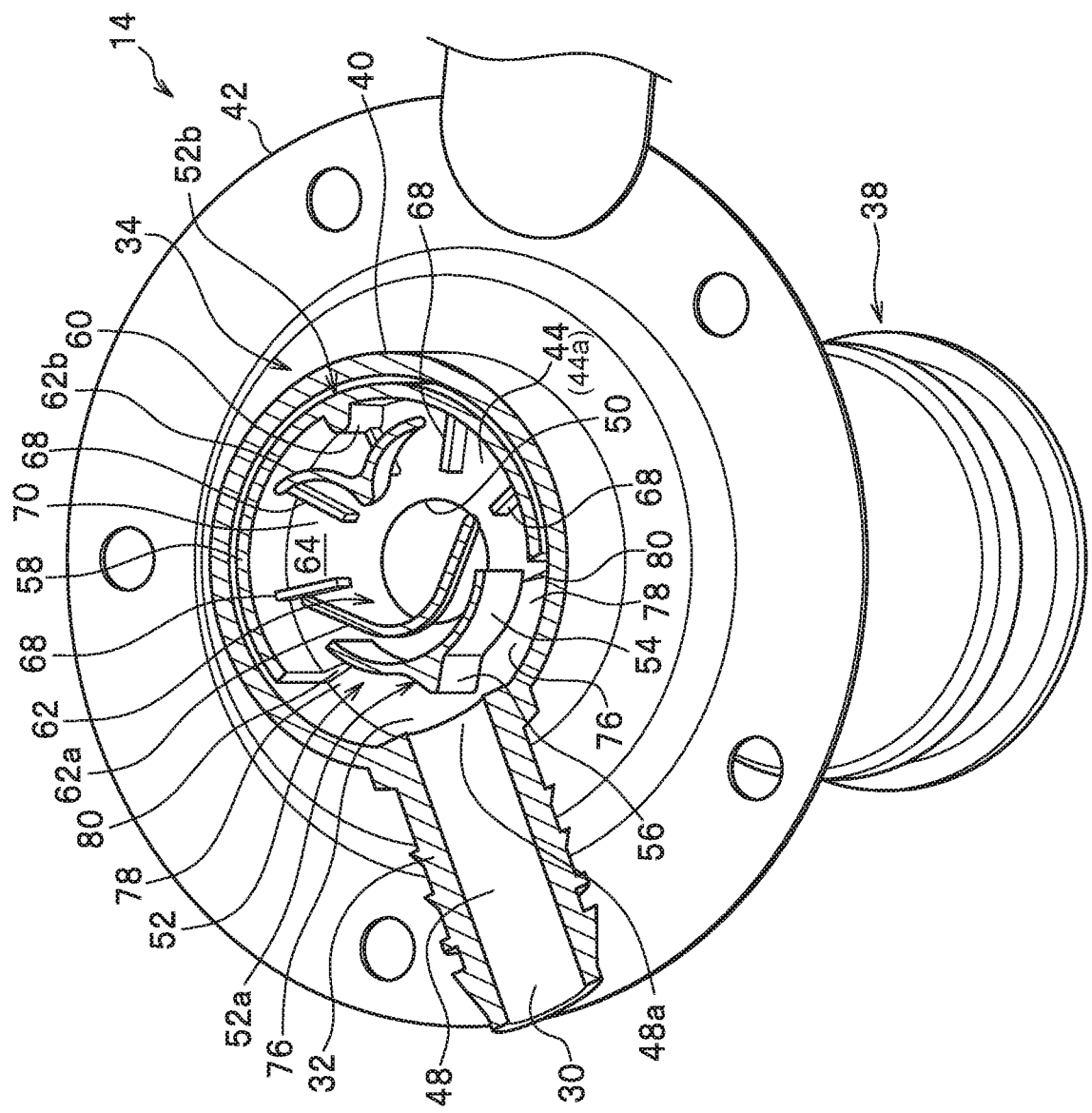
FIG. 4 is a perspective view of the fuel cutoff valve shown in FIG. 2, whose portion is assumed to be cut off partially.
Figure 5:
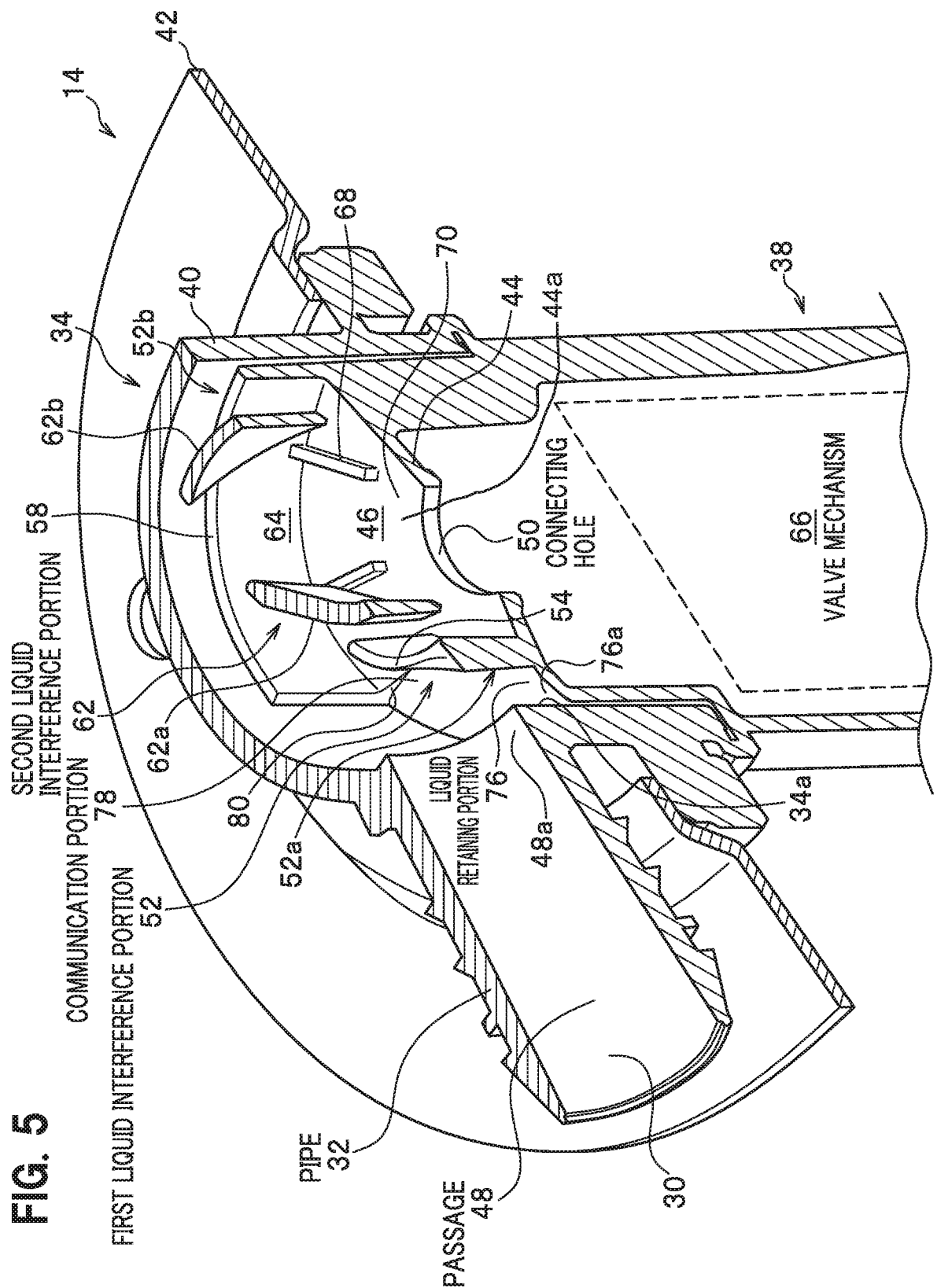
FIG. 5 is an enlarged cross-sectional perspective view of a part of the fuel cutoff valve shown in FIG. 2.

FIG. 4 is a perspective view of the fuel cutoff valve shown in FIG. 2, whose portion is assumed to be cut off, and FIG. 5 is an enlarged cross-sectional perspective view of a part of the fuel cutoff valve.

As shown in FIG. 4, the main body portion 38 includes the upper wall 44 that is a ceiling wall at its upper portion. A connecting hole 50 that is substantially in a rounded shape in a plan view and that penetrates through the upper wall 44 in a vertical direction is formed at the center of the upper wall 44. Further, a first liquid shielding portion 52 that projects upward is formed on an upper surface of the upper wall 44.

As shown in FIG. 4, the first liquid shielding portion 52 includes a front shielding piece 52a that is arranged between the tube body 32 and the connecting hole 50, and a rear shielding piece 52b that is arranged behind the connecting hole 50, when the (extending) tube body 32 side is regarded as a front side. The front shielding piece 52a includes an arc portion in a small diameter 54 and a chevron portion 56 that projects toward the tube body 32 and is formed with the arc portion in a small diameter 54 integrally. The rear shielding piece 52b includes an arc portion in a large diameter 58 that is in parallel with an inner wall 34a of the lid body portion 34, and a projecting portion 60 that projects toward the connecting hole 50 and is formed with the arc portion in a large diameter 58 integrally.

A second liquid shielding portion 62 is formed on an inner ceiling surface of the lid portion 34 (see FIG. 3). The second liquid shielding portion 62 projects (hangs) toward the upper wall 44 of the main body portion 38, as an opposite direction to the first liquid shielding portion 52. In a case where the tube body 32 side is regarded as a front side, the second liquid shielding portion 62 includes a front hanging piece 62a that is formed between the front shielding piece 52a and the connecting hole 50, and a rear hanging portion 62b that is formed between the connecting hole 50 and the projecting portion 60 (see FIG. 4). The first liquid shielding portion 52 of the main body portion 38 and the second liquid shielding portion 62 of the lid body portion 34 define a retaining chamber 64 that temporarily retains the liquid fuel retained in the upper space 46.

The upper space 46 (retaining chamber 64) communicates with a valve mechanism 66 through the connecting hole 50 that is bored through at the center of the upper wall 44 (which also serves as a bottom wall surface 44a, see FIGS. 3-5, of the retaining chamber 64). Partition pieces 68 are formed on the upper surface of the upper wall 44 to project upward. Each partition piece 68 is formed radially with respect to the center of the connecting hole 50 and extends approximately linearly.

Figure 7:
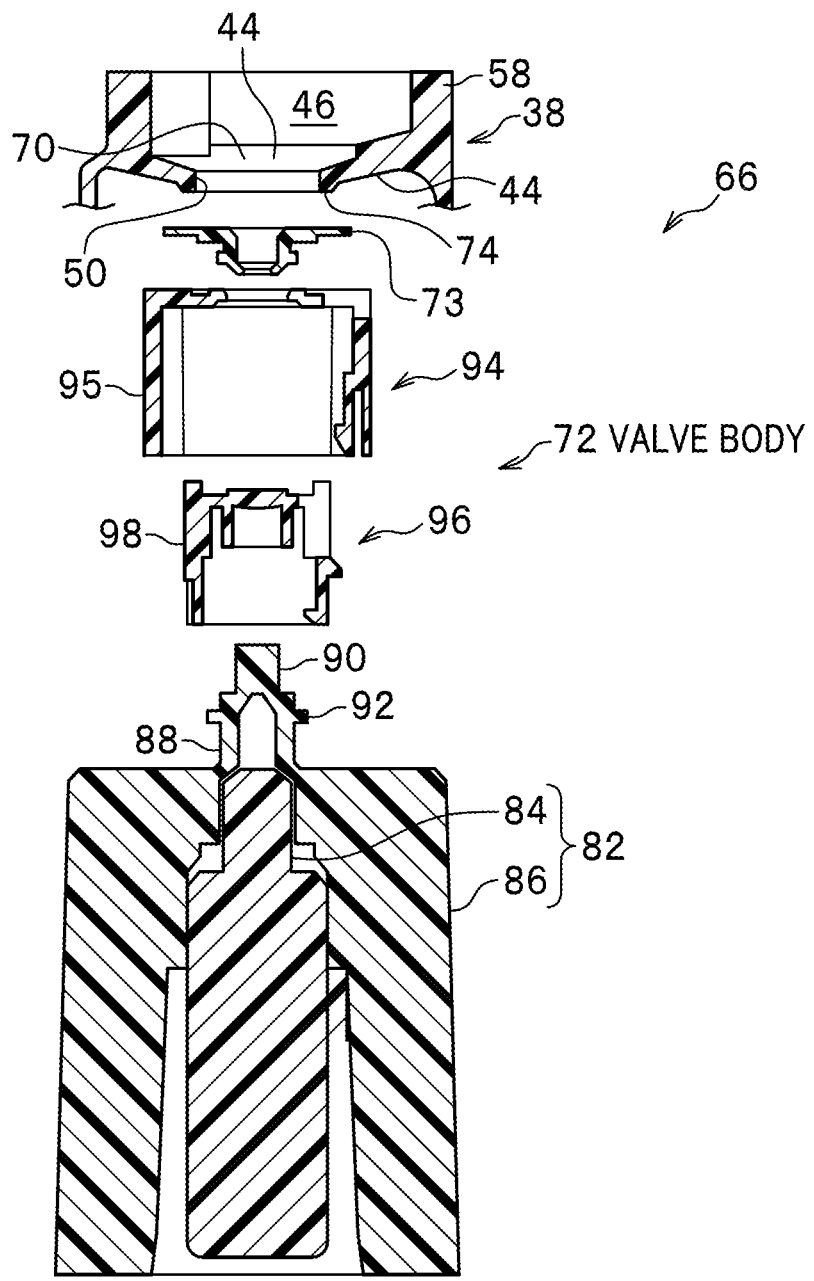
FIG. 7 is an exploded cross-sectional view of a valve mechanism constituting the fuel cutoff valve.

Further, an outer diameter surface continuing from the connecting hole 50 that is formed in the upper wall 44 to the arc portion in a large diameter 58 is formed by an annular inclined surface portion 70. The annular inclined surface portion 70 is a cone-shaped inclined surface that gradually inclines downward from the arc portion in a large diameter 58 located radially outward toward the connecting hole 50 located radially inward. A seated portion 74 on which a seat member 73 of a valve body 72 is arranged under the connecting hole 50, as shown in FIG. 7 shown later.

As shown in FIGS. 3 and 5, a liquid reservoir portion 76 that stores the liquid fuel flown out of the retaining chamber 64 is formed between the tube body 32 and the front shielding piece 52a. The liquid reservoir portion 76 is formed by a groove between the inner wall 34a of the lid body portion 34 that extends downward from an inlet of the tube body 32 and the upper wall 44 of the main body portion 38.

Figure 6:
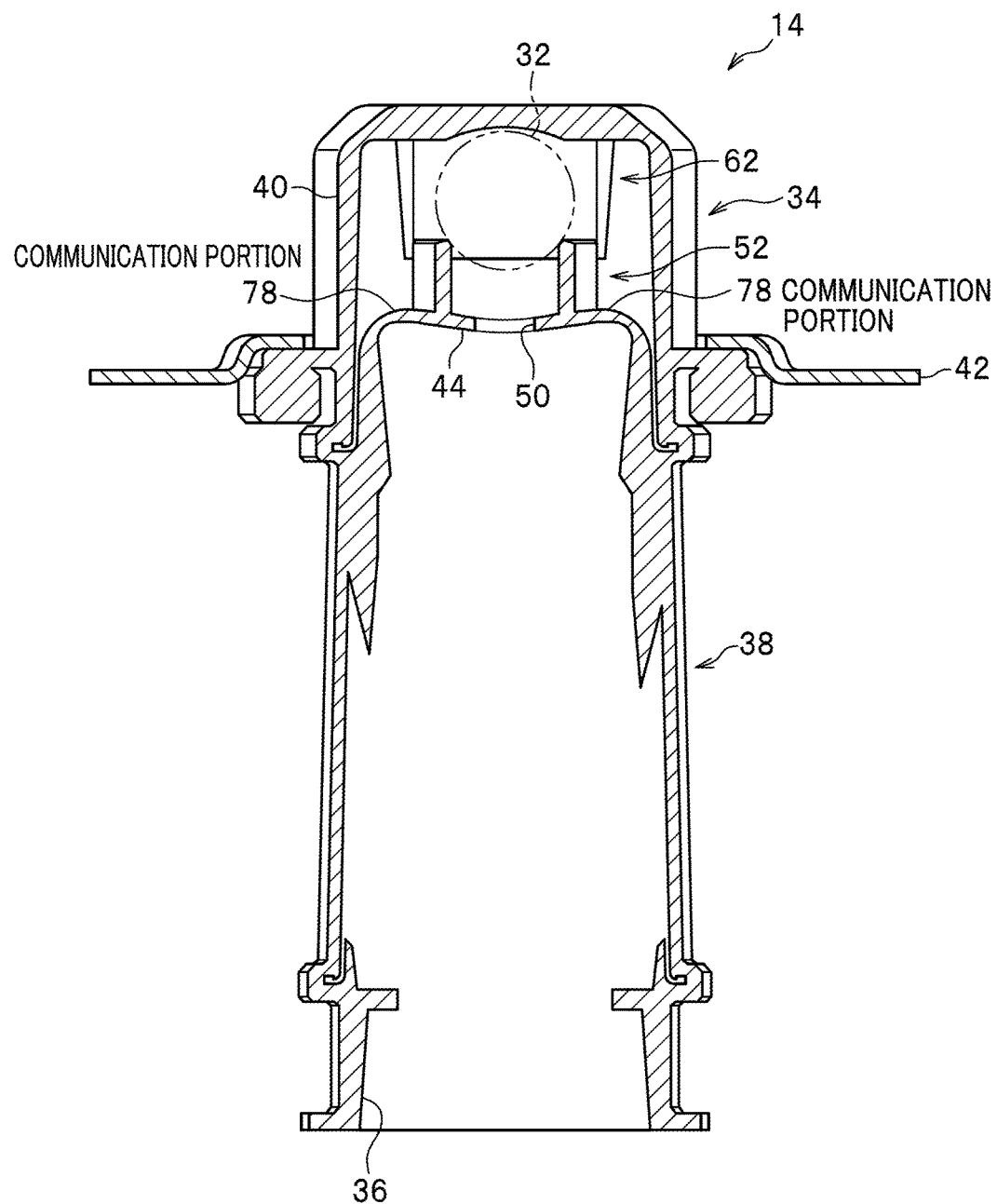
FIG. 6 is a cross-sectional view showing a positional relationship between a tube member and communication passages of the fuel cutoff valve.

FIG. 6 is a cross-sectional view showing a positional relationship between the tube body of the fuel cutoff valve and communication passages. Note that the valve mechanism 66 is not shown in FIG. 6.

In a case where the tube body 32 side (the front side on the paper) is regarded as a front side, a pair of communication portions 78, 78 is formed symmetrically with respect to an axis of the fuel cutoff valve. The pair of communication passages 78, 78 is formed on positions behind the liquid reservoir portion 76 (see FIG. 4) that is formed along an inner peripheral surface of the lid body portion 34 (see FIGS. 4 and 6). Through the pair of communication portions 78, 78, the retaining chamber 64 communicates with the liquid reservoir portion 76. The liquid fuel stored in the liquid reservoir portion 76 easily returns to the valve mechanism 66 through the communication portions 78, 78 and the connecting hole 50. The pair of communicating portions 78, 78 is formed at positions deviated from the tube body 32 so as not to overlap the tube body (see FIG. 6), when the tube body 32 is seen in its axial direction. Each communication portion 78 includes a stepped portion 80 (see FIGS. 4 and 5) that connects a lower portion of the arc portion in a large diameter 58 of the rear shielding piece 52b with the annular inclined surface portion 70.

In the vertical direction, each communicating portion 78 (i.e., every portion of a liquid flow path defined by the communicating portion 78) is formed (located) lower than a bottom wall 48a of the tube passage 48 of the tube body 32 and is formed (located) higher than an inclined bottom wall 76a (see FIG. 5) of the liquid reservoir portion 76.

FIG. 7 is an exploded cross-sectional view of the valve mechanism constituting the fuel cutoff valve.

The valve mechanism 66 including the valve body 72 is accommodated in the main body portion 38. As shown in FIG. 7, the valve mechanism 66 includes a float 82 and the valve body 72 that is arranged above the float 82. The float 82 includes a first float 84 located radially inward and a second float 86 located radially outward. These floats 82, 84 are assembled in one piece. An accommodating hole for accommodating the first float 84 is formed in the second float 86.

A valve support portion 88 projects from an upper portion of the second float portion 86. The valve support portion 88 has a support projection portion 90 in a cylindrical shape. An annular projection portion 92 is formed on an outer peripheral surface of the valve support portion 88 to hold the valve body 72. A spring member (not shown) that supports the float 82 is arranged under the float 82.

The valve body 72 includes a first valve portion 94 and a second valve portion 96. The first valve portion 94 includes a first valve main body 95 and the seat member 73 that is attached to the first valve main body 95. The second valve portion 96 has a second valve main body 98 in a bottomed cylindrical shape.

The evaporated fuel processing system 10 installed with the fuel cutoff valve 14 according to the embodiment is basically configured as described above, and operations and effects thereof will now be described.

The operations of the fuel cutoff valve 14 will be described.

The fuel is fed in the fuel tank 12 through the filler pipe 24a. As a fuel liquid level in the fuel tank 12 increases, the evaporated fuel stayed in the upper portion of the fuel tank 12 flows to the canister 16 through the second port 36, the connecting hole 50, the upper space 46, the tube passage 48 and the vapor passage 18. Further, as the fuel liquid level in the fuel tank 12 increases, an upward pressing force caused by a buoyant force of the float 82 and a spring force of the spring member (not shown) are greater than a downward pressing force caused by a deadweight of the valve mechanism 66, which moves the float 82 upward.

As a result, the valve body 72 is displaced upward with the float 82, the seat member 73 is seated on the seated portion 74, and the connecting hole 50 is closed. Thus, when the fuel tank 1 is fed etc., the evaporated fuel in the fuel tank 12 escapes to the canister 16 and the fuel is prevented from flowing out of the fuel tank 12.

Figure 8:
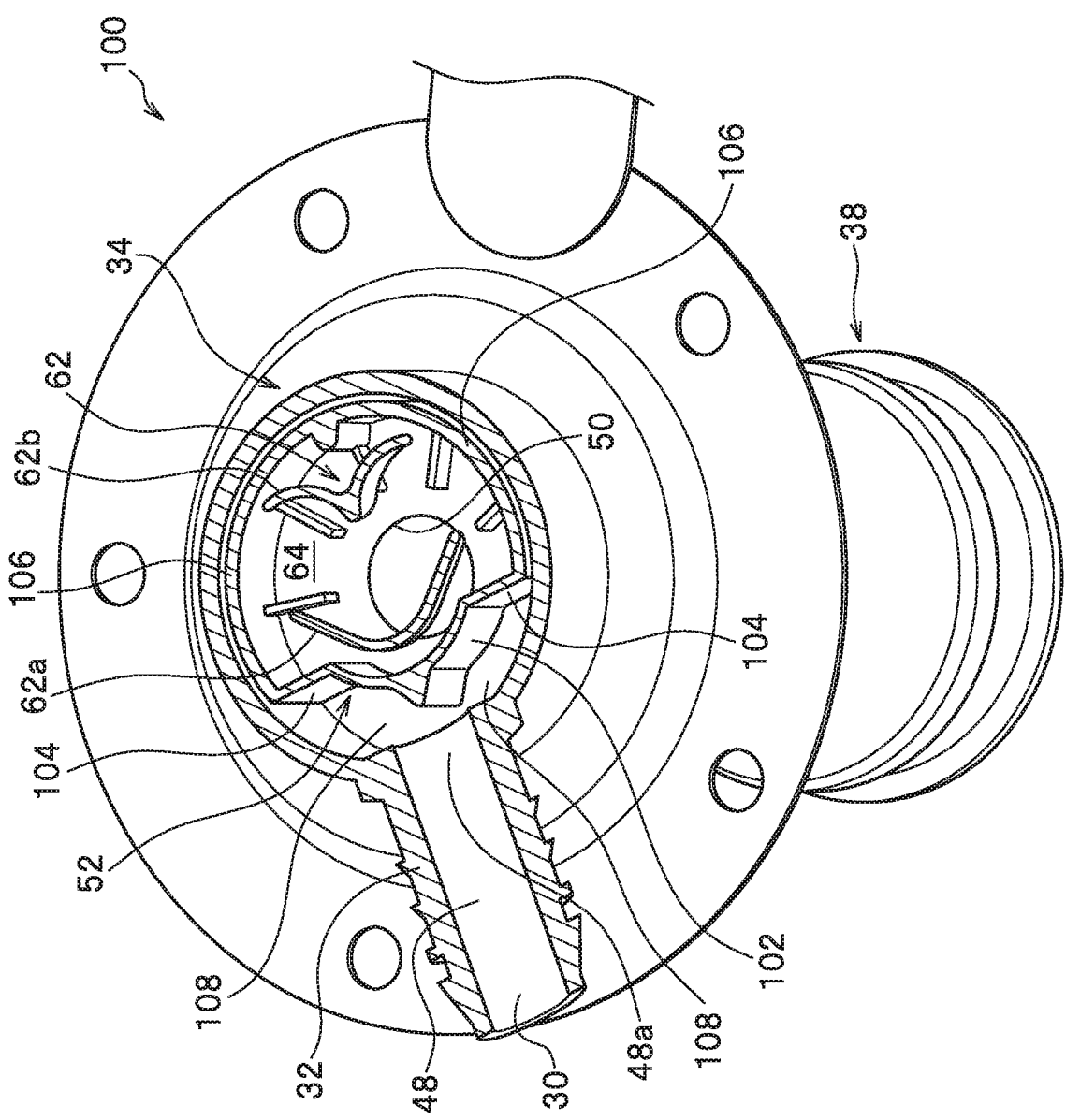
FIG. 8 is a perspective view of a fuel cutoff valve whose portion is assumed to be cut off partially, according to a comparative example shown by the applicant of the invention.

FIG. 8 is a perspective view of the fuel cutoff valve whose portion is cut off partially, according to a comparative example shown by the applicant of the invention.

The comparative example uses the structure of the retaining chamber 64 disclosed in JP5547695B. The comparative example is the same as the embodiment in that the tube body 32 is arranged at an upper portion of the lid body portion 34. Note that, in the comparative example, the same reference numerals are given to the same elements as those in the embodiment.

As shown in FIG. 8, a fuel cutoff valve 100 according to the comparative example includes the retaining chamber 64 defined by the first liquid shielding portion 52 that is arranged on the main body portion 38 and the second liquid shielding portion 62 that is arranged on the lid body portion 34. The first liquid shielding portion 52 includes an arc portion 102, partition walls at a passage side 104 that continue to the arc portion 102, and a partition wall at an outer periphery 106 that continues to the partition walls at a passage side 104. Stepped portions 108 that incline downward are formed between the tube body 32 and the first liquid shielding portion 52.

In the vertical direction, the stepped portions 108 are formed to be lower than the bottom wall 48a of the tube passage 48 of the tube body 32. Further, the arc portion 102 and the partition walls at a passage side 104 that are arranged behind the stepped portion 108 are higher than the bottom wall 48a of the tube passage 48 of the tube body 32 that is arranged in front of the stepped portion 108.

For example, when the air-tight tank system turns into an air-tight state in which the fuel tank 12 is further filled up by additional filling after the fuel tank 12 has been already filled up (for example, when the fuel tank 12 is filled up to 105%), a differential pressure is generated between a pressure (low pressure) in the vapor passage 18 and a pressure (high pressure) in the fuel tank 12. The differential pressure increases the fuel liquid level in the fuel cutoff valve 100 when the fuel cutoff valve 100 is open. The increase of the liquid level causes the liquid fuel to flow to the retaining chamber 64 through the connecting hole 50 before the float 82 works. In other words, the liquid fuel is sucked to the retaining chamber 64 only by the generated differential pressure. A part of the liquid fuel flown to the retaining chamber 64 flows over the first liquid shielding portion 52 to the stepped portion 108. This causes the liquid fuel to be stored in the stepped portion 108. Note that the liquid fuel may be sucked to the retaining chamber 64 by the generated differential pressure and the float 82.

In the comparative example, the liquid fuel stored in the stepped portions 108 may possibly flow to the canister 16 through the tube passage 48 of the tube body 32. That is, the liquid fuel stored in the stepped portion 108 can hardly flow over the arc portion 102 and the partition walls at a passage side 104 of the first liquid shielding portion 52 to return to the valve body 72. The liquid fuel may possibly flow out to the canister 16 easily through the tube passage 48 of the tube body 32 that is lower than the first liquid shielding portion 52.

On the other hand, in the embodiment, barrier walls such as the arc portion 102 of the first liquid shielding portion 52 and the partition walls at a passage side 104 in the comparative example are not arranged behind the liquid reservoir portion 76 (see FIGS. 4 and 8 for comparison). Accordingly, the liquid fuel stored in the liquid reservoir portion 76 returns to the valve body 72 through the communication portions 78, 78 that are lower than the bottom wall 48a of the tube passage 48 of the tube body 32 and the connecting hole 50.

Thus, in the embodiment, the liquid fuel stored in the liquid reservoir portion 76 easily returns to the valve body 72 through the communication portions 78, 78 that connect the liquid reservoir portion 76 with the retaining chamber 64, the retaining chamber 64 and the connecting hole 50. Accordingly, in the structure having the retaining chamber 64 that is defined by the first liquid shielding portion 52 and the second liquid shielding portion 62 to retain the liquid fuel as described in the embodiment, a gas-liquid separation function to the fuel is improved and the liquid fuel is prevented from flowing out to the canister 16.

Further, in the embodiment, the pair of communication portions 78, 78 is formed at positions deviated from the axial direction of the tube body 32 so as not to overlap the tube body (see FIG. 6), when the tube body 32 is seen in its axial direction. Thus, compared with the related art in which the tube body 32 that communicates with the canister 16 is directed to the same axial direction as the retaining chamber 64, in the embodiment, the liquid fuel is further prevented from flowing out to the canister 16.

Still further, in the embodiment, the fuel tank 12 and the fuel cutoff valve 14 form the air-tight tank system, and the fuel cutoff valve 14 is used in the fuel tank 12. The liquid fuel is easily sucked to the retaining chamber 64 by the differential pressure generated in the fuel tank 12. Accordingly, the stored liquid fuel in the liquid reservoir portion 76 through the communication portions 78, 78 easily returns to the valve body 72 (see FIG. 7) through the retaining chamber 64.

Yet further, in the embodiment, each communication portion 78 is formed lower than the bottom wall 48a of the tube passage 48 of the tube body 32 and higher than the inclined bottom wall 76a of the liquid reservoir portion 76 in the vertical direction. This allows the liquid fuel to return to the valve body 72 easily.

What is claimed is:

1. A fuel cutoff valve comprising:
   a main body portion having an upper wall, and a lid body portion;
   a valve mechanism accommodated in the main body portion, the valve mechanism having a float and a valve body that is disposed above the float, the valve body preventing a vapor from flowing in a vapor passage through which a fuel tank communicates with a canister by closing a connecting hole bored in the upper wall of the main body portion at a position above the valve mechanism;
   an upper space that is defined by the upper wall of the main body portion and the lid body portion;
   a tube body that has a tube passage to be communicated with the upper space and introduces a fuel gas to the canister, wherein the tube passage has a tube bottom wall;
   a retaining chamber that is defined in the upper space by a first fuel shielding plate having a front shielding piece that is disposed in front of the connecting hole between the tube body and the connecting hole and a second fuel shielding plate, wherein the second fuel shielding plate has a rear shielding piece that is disposed behind the connecting hole, so the connecting hole is disposed between the rear shielding piece and the tube body, to retain a liquid fuel stored in the upper space, and the retaining chamber has a bottom wall surface constituted by the upper wall of the main body portion;
   a liquid reservoir portion defined between the tube body and the front shielding piece and having a reservoir bottom wall located lower than the tube bottom wall to store a liquid fuel flowing out of the retaining chamber; and
   a communication portion which defines a liquid flow path extending from the bottom wall surface of the retaining chamber to the reservoir bottom wall of, the liquid reservoir portion and through which the retaining chamber communicates with the liquid reservoir portion,
   wherein every portion of the liquid flow path is located lower than the tube bottom wall and higher than the reservoir bottom wall, and
   wherein the communication portion is formed at a position deviated from the tube body so as not to overlap the tube body, when the tube body is seen in an axial direction of the tube body.

2. An air-tight tank system comprising the fuel tank and the fuel cutoff valve according to claim 1 that is installed in the fuel tank.

* * * * *